(12) United States Patent
White et al.

(10) Patent No.: US 8,224,334 B1
(45) Date of Patent: Jul. 17, 2012

(54) CALLING CONNECTION FOR MOBILE COMMUNICATION

(75) Inventors: Robert Fleming White, Decatur, GA (US); Alan Johns, Stone Mountain, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 765 days.

(21) Appl. No.: 11/691,644

(22) Filed: Mar. 27, 2007

(51) Int. Cl.
*H04W 40/00* (2009.01)

(52) U.S. Cl. .................... 455/445; 370/360; 455/418

(58) Field of Classification Search ............... 455/432.1, 455/433, 436, 437, 439, 442, 445, 415, 418, 455/420, 435.1, 435.2; 370/355, 356, 360, 370/385, 386, 496
See application file for complete search history.

(56) References Cited

U.S. PATENT DOCUMENTS

| | | | | |
|---|---|---|---|---|
| 2003/0129991 | A1* | 7/2003 | Allison et al. | 455/456 |
| 2005/0003838 | A1* | 1/2005 | McCann et al. | 455/466 |
| 2005/0170837 | A1* | 8/2005 | Halsell | 455/445 |
| 2006/0034267 | A1* | 2/2006 | Torrey et al. | 370/360 |
| 2009/0264122 | A1* | 10/2009 | Van Loon et al. | 455/433 |

* cited by examiner

*Primary Examiner* — Danh Le
*Assistant Examiner* — Dinh P Nguyen
(74) *Attorney, Agent, or Firm* — Turocy & Watson, LLP

(57) ABSTRACT

Providing for data exchange between mobility management and location management components over a signaling network to facilitate establishment of end-to-end mobile communication is disclosed herein. Components can include an access control component that receives identification information associated with a target mobile device, and a lookup component associated with the mobile device that can provide routing information via a signaling network to the access control component. Such routing information can be sufficient to locate a second access control component serving the target device to assist in establishing end-to-end communication between the target device and an originating device. By such systems and methods, the claimed subject matter can increase scalability and capacity of finite core network resources engaged in facilitating mobile communication.

20 Claims, 9 Drawing Sheets

CALLING CONNECTION FOR MOBILE COMMUNICATION

BACKGROUND

Mobile communication networks continue to experience commercial growth as a result of increasing numbers of mobile subscribers and demand for advanced data transfer technologies associated with modern mobile devices and communication networks. Additionally, changes within the communication network structure, created by business mergers and regulations governing number pooling and portability, have put network communication resources at a premium. Such factors have impacted a mobile operator's ability to cost-effectively manage valuable network resources.

Particularly affected is the management of available network communication trunks to effectuate end-to-end communication. In telecommunications, a trunk is a single transmission channel between two points, e.g., two switching centers, nodes, or both. Trunk lines resources form a major source of overhead cost for communication service providers, as they typically require some dedicated electronic logical connection between two remote points. As such, operators desire to increase the number of communications that can take place via a set number of trunks, and/or reduce a number of trunks necessary to effectuate each communication.

One mechanism that has been effective in recent years to conserve logical communication resources has been the adoption of signaling networks to perform signaling and setup operations between network equipment. Each remote communication requires several initial procedures for such communication to be established. Typically, lookup procedures must be performed to identify, locate and direct communication towards equipment serving a target device. Furthermore, network resources, e.g., trunk lines or portions thereof, routing bandwidth of Internet protocol (IP) network routers, or the like, are typically reserved and/or dedicated to each end-to-end communication to ensure a particular quality of service. In early, traditionally telephony, a number of communication trunk lines had to be utilized to perform these signaling and/or setup operations for intended end-to-end communication. Signaling networks, such as the signaling system-7 (SS7) and similar variants utilized in circuit switched and/or packet-switched mobile networks, were established to bear the burden of these signaling and setup operations, allowing expensive network trunk and/or routing resources to be allocated more liberally to end-to-end communication instead. Consequently, operators were able to increase communication capacity as a result of the efficiency provided by these signaling networks.

Modern mobile operators typically work to efficiently manage signaling and end-to-end communication resources to optimize their network capacity and scalability. Increased capacity results in higher revenues for a same overhead cost, and ultimately leads to greater commercial efficiency. Therefore, operators are typically engaged in research and experimentation to discover new mechanisms for increasing such capacity and efficiency.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The claimed subject matter provides for data exchange between mobility management and location management components over a signaling network to facilitate establishment of end-to-end mobile communication. Components can include an access control component that receives identification information associated with a target mobile device, and a lookup component associated with the mobile device that can provide routing information via a signaling network to the access control component. Such routing information can be sufficient to locate a second access control component serving the target device to assist in establishing end-to-end communication between the target device and an originating device. The claimed subject matter facilitates signaling and setup functions for mobile communication utilizing a signaling network instead of trunk communication for such functions. Consequently, greater trunk resources can be provided for end-to-end communication, increasing network capacity, scalability, and efficiency.

In accord with further aspects of the claimed subject matter, a core network access component, e.g., a mobile switching center, a serving GPRS support node (SGSN) (where a GPRS can refer, e.g., to a general packet radio system), or like device, can retrieve routing information via a signaling network directly from a GFLEX (e.g., a device associated with intelligent management of a location registry base, including devices such as a home location registry, a visited location registry, and the like) associated with a target mobile device. Such routing information can uniquely identify a second network access component serving the target mobile device. Consequently, the core network access component can setup and initiate end-to-end communication with a target mobile device without devoting core network resources to the setup procedures. Such resources can include trunk lines associated with a circuit switched network, and/or router bandwidth capacity associated with a packet switched network. As a result, the claimed subject matter can increase efficiency and scalability of modern mobile communication networks of varying network architecture.

To the accomplishment of the foregoing and related ends, certain illustrative aspects are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
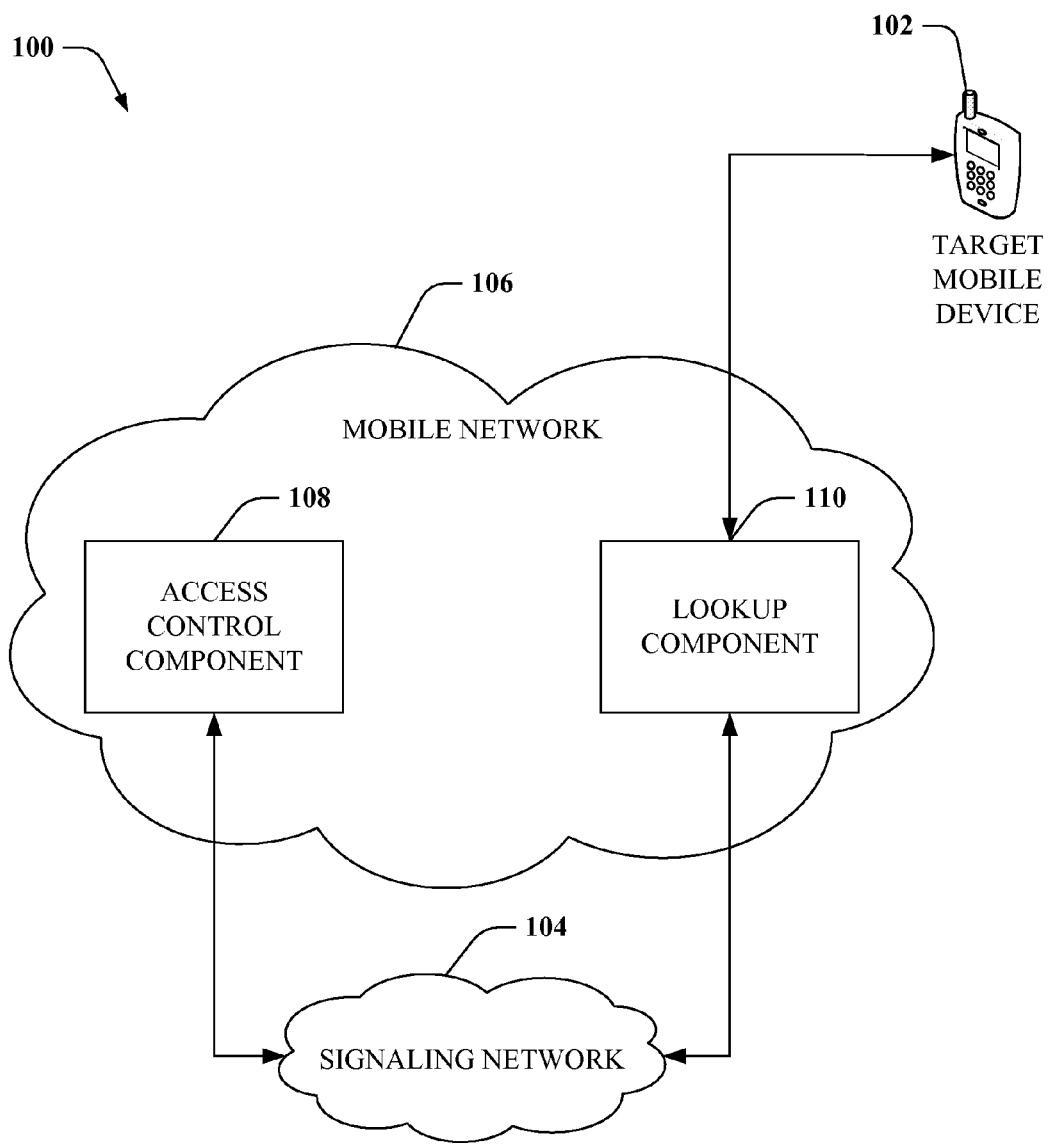
FIG. 1 illustrates an exemplary system for locating a target mobile device via a signaling network in accord with aspects of the subject innovation.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "module," "system", "interface", or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. As another example, an interface can include I/O components as well as associated processor, application, and/or API components, and can be as simple as a command line or a more complex Integrated Development Environment (IDE).

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

FIG. 1 illustrates an exemplary system 100 for locating a target mobile device 102 via a signaling network 104 in accord with aspects of the subject innovation. Utilizing a signaling network for such location can conserve core network resources (e.g., resources associated with mobile network 106), increasing capacity and scalability of such network (106) in regard to end-to-end mobile communication. To provide context for the subject innovation, an example follows that illustrates a typical scenario performed by network components to form an end-to-end communication with a target mobile device (102). Additionally, various mobile network architectures can employ variations of the following illustration for end-to-end mobile communication not specifically indicated herein, e.g., different components, different communication protocols, or variations of typical protocols, etc., can be utilized. Consequently, it should be appreciated that the example depicted should not be construed so as to limit the subject disclosure to the embodiment(s) described. Rather, embodiments known in the art or made known to one of skill in the art by way of the context provided by the following example are incorporated as part the subject disclosure.

For a typical global system for mobile communication (GSM) network, a mobility management component (e.g., access control component 108), such as a mobile switching center (MSC) or similar component of a circuit switched mobile network (106) (or, e.g., a serving GPRS support node (SGSN), where GPRS can refer to a general packet radio system, for a typical packet-switched or combination circuit/packet switched network, such as a universal mobile telecommunication system (UMTS) network), must first determine a location of a target mobile device (102) when an incoming call requests communication with such a device. The incoming call can typically provide information that uniquely identifies the target mobile device (102) (e.g., a phone number associated with such device). An MSC (108) can extract ID information associated with a target device (102) and use that to initiate location procedures. For instance, location procedures can include referencing a local number portability (LNP) and/or mobile number portability (MNP) database to determine a carrier associated with a particular phone number.

Number portability can refer to an ability to change a number from the purview of one carrier to that of another carrier. Subscribers often prefer to retain a particular phone number for convenience purposes, even if such subscriber switches from one carrier to another. Consequently, a mechanism is required to track numbers that are ported from the domain of one carrier to that of another. An LNP/MNP database (e.g., depicted at 310 of FIG. 3) can perform this function; such database retains updated lists of local and mobile phone numbers and carriers concurrently associated with those numbers. Therefore, in the context of the provided example, when an MSC (108) receives a request to establish end-to-end communication with a target device (102) associated with a target phone number, the MSC (108) can reference an LNP database and determine a carrier for the target phone number.

Mobile carriers can have network components that retain information associated with a particular device (e.g., components proximate an office where a subscription was begun, a home location of a subscriber, an MSC proximate where a device is most commonly located, etc.), typically referred to as a home MSC and/or home register (e.g., related to lookup component 110). When an originating MSC (108) performs an LNP reference and determines a carrier associated with a phone number, such MSC can forward the call request to network components associated with the carrier (e.g., a gateway MSC, or GMSC), which can then route the request to a home MSC associated with the target phone number/mobile device.

A home MSC can utilize an associated home location register (HLR) (e.g., related to lookup component 110) to locate and route communication to a target device (102). Specifically, each time a device logs on to a local component of a GSM network (e.g., when a device is powered on and communicates with a local MSC), such local component can reference the HLR (e.g., related to lookup component 110) for the target device (e.g., to authenticate the device, determine related quality of service (QoS) information, identify a carrier for the device etc.) The HLR can provide subscription, QoS, charging information, and the like to a local MSC, and a remote location registry (e.g., visited location registry (VLR)) associated with the local MSC can provide routing information to the HLR. Thus, an HLR and home MSC associated with a device will typically have routing information required to direct communication to the device. So routing a call from an originating MSC (108) to a home MSC can be effective for providing mobile communication. However, such routing can typically require core network communication resources, e.g., a trunk communication line in a GSM network. Consequently, a trunk line is formed between an originating MSC (108) and a home MSC, and then another trunk line between a home MSC and a serving MSC to create a single end-to-end communication with a target mobile device (102). Because trunk lines require finite logical resources, each trunk line dedicated to a communication can decrease network capacity and scalability.

System 100 can perform signaling and location procedures via a signaling network to avoid dedicating a trunk line to routing a call to a home MSC. Mobile network 106 can include circuit switched mobile communication networks (e.g., GSM, a time division multiple access (TDMA), a code division multiple access (CDMA), such as IS-95 and subsequent iterations of CDMA technology, an integrated digital enhanced network (iDEN) and the like), packet-switched mobile communication networks (e.g., UMTS, wideband code division multiple access (WCDMA), and the like), and combination circuit and packet switched networks (e.g., GSM/enhanced data rates for GSM evolution (EDGE) network). Mobile network 106 can include an access control component 108 that can manage mobility functions as mobile devices move from one area to another, track charging information associated with mobile voice and/or data communication, and initiate reservation of network resources for end-to-end communication. Specific examples of access control component 108 can include, e.g., an MSC, an SGSN, or similar device. Lookup component 110 can be a network device associated with device location management responsible for at least routing information related to target mobile device 102. For example, lookup component 110 can access location registry information and/or assist in managing intelligent routing across a location registry base (e.g., HLR/VLR routing, communication, etc.) Such location registry can include numbers associated with particular mobile devices, including target mobile device 102. A specific example of lookup component 110 can include a GFLEX (e.g., a device associated with intelligent management of a location registry base, including devices such as a home location registry, a visited location registry, and the like) that manages, routes, accesses, and shares numbers (e.g., including a number for target mobile device 102) across various network location registers.

Signaling network 104 can be any suitable out-of-band network that effectuates communication between network resources to establish end-to-end communication over a bearer network channel. Examples of signaling network 104 can include SS7 protocol networks (e.g., utilizing services digital network (ISDN) user part (ISUP), mobile application part (MAP) and like signaling and setup protocols), session initial protocol (SIP) networks (e.g., utilized in conjunction with packet switched internet protocol (IP) communication and voice over internet protocol (VoIP)), and the like. Signaling network 104 can connect requests from access control component 108 to lookup component 110 without utilizing core network resources (e.g., trunk lines, router bandwidth, etc.). Consequently, access control component 108 can forward identification information associated with target mobile device 102 (e.g., a phone number associated with target mobile device input by an originating device connected to access control component, or forwarded to access control component by a network GMSC, not shown) to lookup component 110 via signaling network 104.

Lookup component 110 can receive identification information related to target mobile device 102 and retrieve concurrent routing information (e.g., obtained by a location registry) sufficient to form an end-to-end communication (e.g., a voice and/or data bearer channel) between access control component 108 and a control component serving target mobile device 102 (e.g., a serving MSC associated with such device). The routing information obtained by lookup component 110 can be sent to access control component 108 via signaling network 104. Subsequently, access control component 108 can utilize the routing information to identify a remote network component (not shown) capable of forming a radio link with target mobile device 102. Utilizing the routing information, access control component 108 can establish an end-to-end communication channel between an originating device (e.g., a mobile phone, a public switched transport network (PSTN) phone, a VoIP phone, a satellite phone, etc.) and target mobile device 102. In such a manner, system 100 can perform signaling and setup routines without utilizing core network resources, increasing capacity and scalability of such core network.

Figure 2:
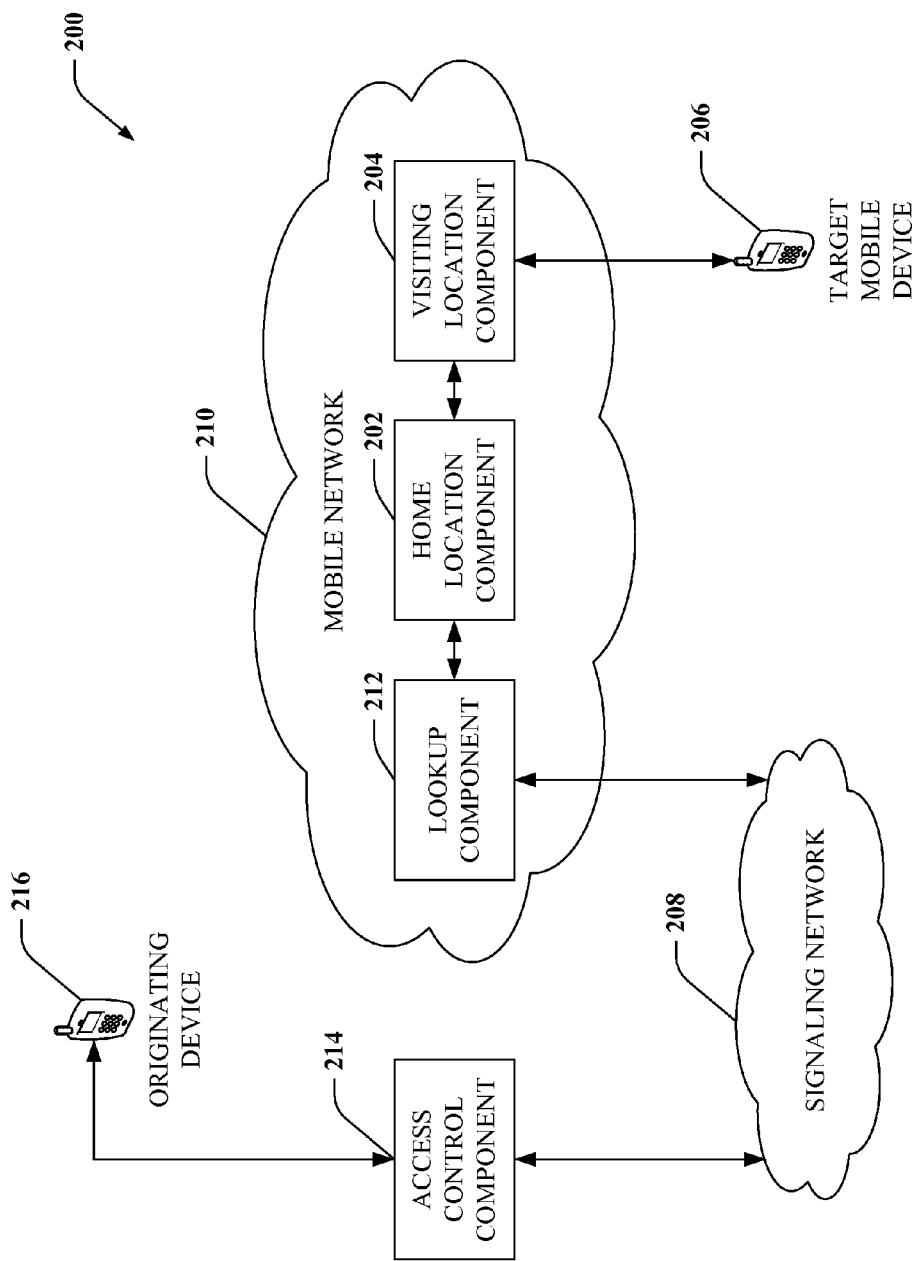
FIG. 2 depicts a sample system that accesses home and visiting location components associated with a mobile device via a signaling network in accordance with additional aspects of the claimed subject matter.

FIG. 2 illustrates an exemplary system 200 that accesses home (202) and visiting (204) location components associated with a mobile device (206) via a signaling network (208) in accordance with additional aspects of the claimed subject matter. By establishing location procedures over signaling network 208, system 200 can preserve core network resources as compared with traditional setup procedures. Consequently, system 200 can provide increased end-to-end communication capacity for a given mobile communication network.

Mobile network 210 can be any suitable mobile communication network as described supra (e.g., GSM, TDMA, CDMA, GSM/EDGE, UMTS, and the like). Components of mobile network 210 can utilize a signaling network 208 for call signaling and setup routines. Examples of signaling and setup routines can include locating a target communication device (206), signaling network resources that a call is incoming on a particular trunk or channel or via a particular routing interface, reserving network resources to provide QoS parameters for the call (e.g., bandwidth, bit-rate, packet loss or priority for packet networks, etc.), detecting and initiating call services (e.g., ring-tones, 3-way calling, caller ID, call waiting, or the like), initiating application services (e.g., data packet applications such as streaming data), or call termination and tear-down procedures, or combinations thereof. Signaling network 208 can also be used to coordinate communication between different provider networks, types of networks (e.g., local phone company, long-distance carrier, etc.), networks of differing architectures (e.g., circuit switched and packet switched networks) and the like. As an example, a circuit switched network using an SS7 signaling protocol can specify various functions required to effectuate a call between network components. Such components can specify that a call be forwarded from one number to another number. A related component (e.g., home location component 202, visiting location component 204, and/or lookup component 212 such as a location registry GFLEX) could then locate a device associated with the second, forwarded number. Components can specify what channel or trunk an incoming call is routed on, so that target components can identify the proper channel for the requested communication. Additionally, components can identify a termination event (e.g., caller hangs up, loses signal, etc.) and terminate a call, freeing up network resources for subsequent communication. Signaling and setup networks can perform various other functions; those known in the art are contemplated as within the purview of signaling network 208.

Access control component 214 can receive information from an originating device 216 pertaining to a requested communication with target mobile device 206. Access control component 214 can be a network component responsible for mobility management and similar routing and accounting functions in a communication network. Additionally, access control component 214 can be associated with mobile network 210, or can be associated with a separate network (e.g., a different provider's network, a non-mobile network, a network of a different architecture, or combinations thereof). For example, originating device 216 can be a PSTN landline device, and access control component 214 can be a local switch associated with a local telephone company serving originating device 216. Upon receiving a request from originating device 216, access control component 214 can extract identification information (e.g., phone number) related to target mobile device 206 and reference an LNP/MNP database (not shown) to identify a carrier associated with such identification information. Once a carrier is identified, access control component 214 can forward the identification information to lookup component 212 (e.g., location registry GFLEX) via signaling network 208 associated with such carrier and/or with target mobile device 206. Utilizing signaling network 208 for forwarding the identification information preserves core network resources during device location procedures.

Lookup component 212 can reference a home location component 202 associated with target mobile device 206. Home location component 202 can contain information related to target mobile device 206, including routing information associated with visiting location component 204. Visiting location component 204 can include devices (e.g., a remote serving MSC, SGSN, or the like, and a related remote VLR) that can control a contemporaneous radio link between target mobile device 206 and mobile network 210 (e.g., over an associated radio access network) and provide routing information sufficient to establish end-to-end communication with such device. Home location component 202 can provide the routing information to lookup component 212, which can forward the routing information via signaling network 208 to access control component 214. Subsequently, access control network can initiate an end-to-end communication with visiting location component 204, connecting originating device 216 and target mobile device 206. It should be appreciated that intervening networks may exist between access control component 214 and visiting location component 204 that assist in effectuating such end-to-end communication. Regardless, system 200 can preserve network core resources by locating serving communication components (e.g., visiting location component 204, such as a serving MSC/VLR) via signaling network 208 and establishing a communication trunk between such serving communication components and access control component 214.

Figure 3:
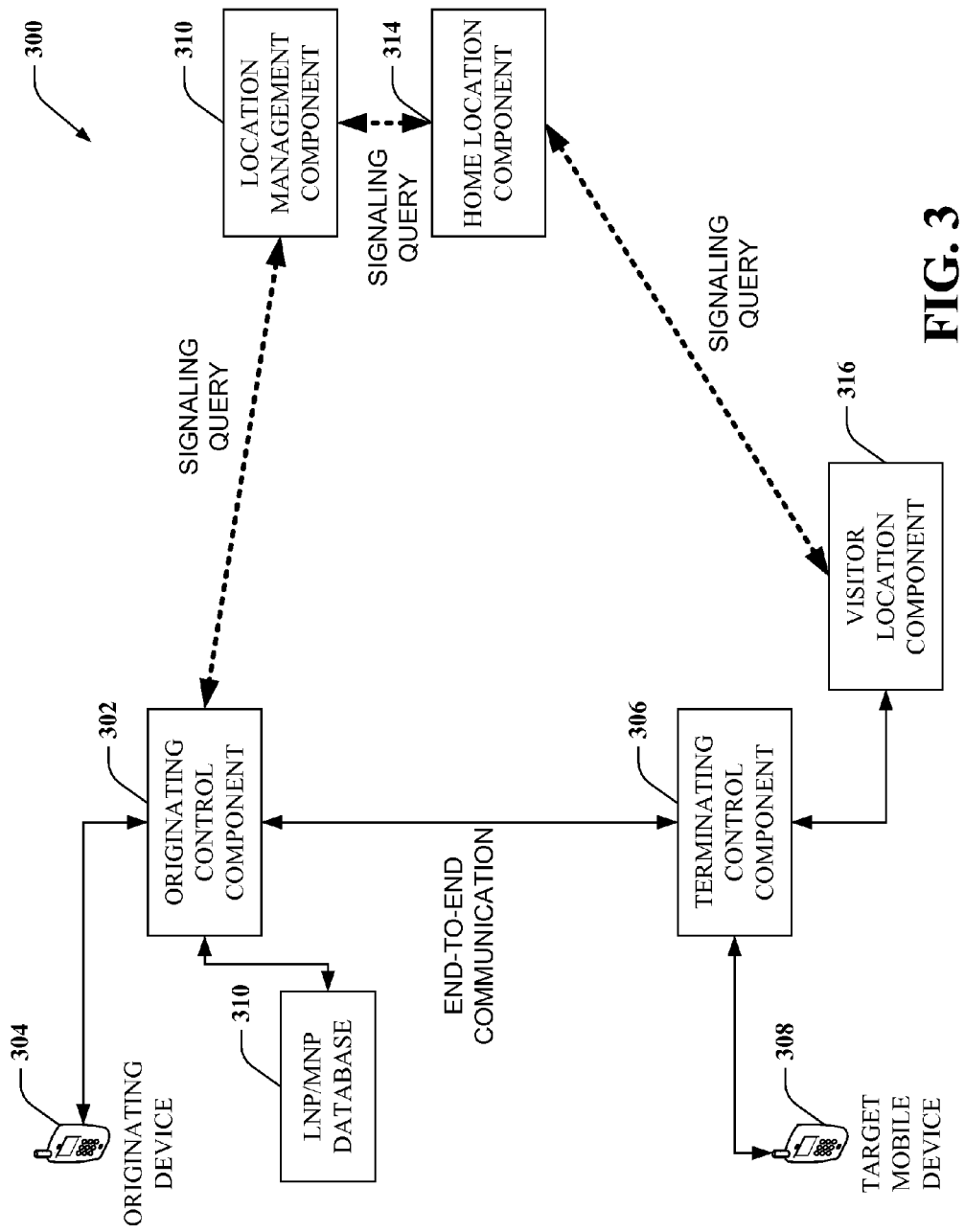
FIG. 3 illustrates an exemplary system for establishing an end-to-end communication while preserving core network resources in accord with further aspects of the subject innovation.

FIG. 3 depicts a particular embodiment of the subject innovation in accord with aspects disclosed herein. More specifically, system 300 can establish end-to-end communication between an originating control component 302 serving an originating device 304, and a terminating control component 308 serving a target mobile device 308. It should be appreciated that originating control component 302 and originating device 304 can be associated with a mobile network, an IP network, a landline (e.g., PSTN, POTS, or the like) network, etc., and originating device 304 can be an associated mobile, IP, landline, etc., device, respectively.

Originating control component 302 can receive a request to establish a communication between originating device 304 and target mobile device 308. From such request, originating control component 302 can extract ID information associated with target mobile device 308 (e.g., phone number) and reference an LNP/MNP database 310 to identify a carrier associated with the ID information. LNP/MNP database 310 can be a network data store capable of associating phone numbers with carriers, and updating phone numbers and carriers as subscribers port such numbers from one carrier to another. Consequently, having a phone number associated with a target mobile device (308) can be sufficient to identify a related carrier via LNP/MNP database 310.

LNP/MNP database 310 can provide originating control component 302 with a mobile network carrier responsible for service to target mobile device 308. Subsequently, originating control component 302 can forward ID information received from originating device 304 to network components (e.g., location management component 310) associated with the mobile network carrier via a signaling query (e.g., utilizing SS7, SIP, and/or similar protocols). Location management component 310 can be a device that intelligently routes and manages traffic between location register components (e.g., HLRs, and VLRs of a provider's network) associated with target mobile device 308. More specifically, location management component 310 can include, for example, a GFLEX location management device. Location management component 310 requests routing information related to the ID information (and, e.g., the associated mobile device (308)) from home location component 314.

Home location component 314 can include, for example, an HLR associated with target mobile device 308. Such component can receive routing information related to a remote control component (306) in radio contact with target mobile device 308, from a visitor location component 316. Home location component 314 then forwards such routing information to location management component 310, which in turn forwards it to originating control component via signaling communication of a signaling network (e.g., SS7, SIP, or the like). Once originating control component has routing information related to terminating control component 306, an end-to-end communication can be formed between originating control component 302 and terminating control component 306, which can effectuate direct communication between originating device 304 and target mobile device 308. In such a manner, originating control component 302 can establish communication between such devices while utilizing minimal core network resources, as compared with typical call setup routines for mobile devices.

Figure 4:
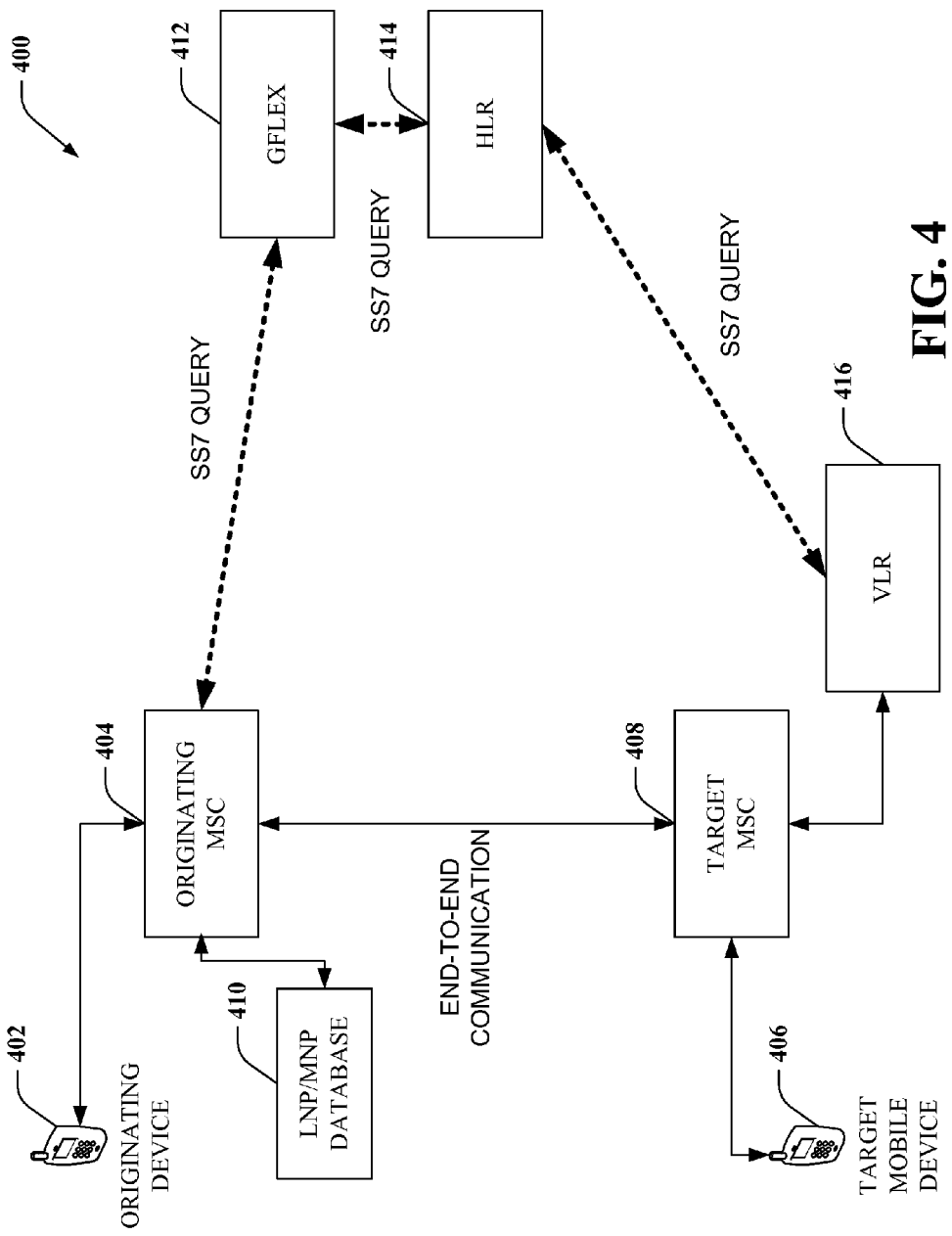
FIG. 4 illustrates an exemplary system for preserving network resources for a circuit-switched mobile communication in accordance with specific aspects disclosed herein.

FIG. 4 illustrates an exemplary system for preserving network resources for a circuit-switched mobile communication in accordance with specific aspects disclosed herein. Originating device 402 can be any suitable voice or voice and data communication device, such as a mobile phone, VoIP phone, PSTN phone, satellite phone, or like communication device that can communicate with a network capable of interfacing with a circuit-switched (CS) mobile network. Originating MSC 404 is a mobile switching station that can receive a request for communication with a target mobile device 406, from originating device 402. The request can be directly from a radio access network (RAN) connected to originating device 402, or from a gateway MSC (not shown) associated with a CS mobile network that can route traffic to originating MSC 404.

Originating MSC 404 can attempt to locate a target MSC 408 providing communication service to target mobile device 406, in order to effectuate communication between originating device 402 and target mobile device 406. ID information contained within a request for communication (e.g., mobile number associated with target mobile device 406) can be extracted from such request. By referencing an LNP/MNP database 410, originating MSC 404 can identify a service provider associated with the ID information. After identifying a service provider, originating MSC 404 can forward the ID information to a GFLEX 412 associated with such service provider, to obtain routing information from network location components servicing target mobile device 406. Specifically, the ID information can be forwarded via an SS7 signaling query to GFLEX 412, avoiding a typical procedure in CS networks of forwarding a call via a communication trunk to a home MSC associated with target mobile device 406 (e.g., to perform location procedures and establish an additional communication trunk between such home MSC and target MSC 408 to complete the end-to-end communication).

GFLEX 412 can be a location register intelligent management device that facilitates communication and routing among home and visited location registers of a mobile network. As such, GFLEX 412 can communicate with and obtain routing information from such location registers, which maintain update routing information related to roaming mobile devices. GFLEX 412 can query an HLR 414 related to target mobile device 406. HLR 414 can contain subscription information, charging information, information related to location, etc., associated with target mobile device 406. Information related to location can include a VLR 416 associated with a target MSC 408 currently serving target mobile device 406.

HLR 414 can send a query to VLR 416 to receive routing information for target MSC 408. The routing information can be sufficient for an MSC (e.g., originating MSC 404) to initiate a communication trunk with target MSC 408, and consequently with any mobile device logged onto a RAN served by target MSC 408. HLR 414 forwards the routing information to GFLEX 412, which in turn sends an SS7 reply back to originating MSC 404 with the routing information. Subsequently, originating MSC 404 can initiate an end-to-end communication channel, as depicted by FIG. 4, with target MSC 408, thereby connecting originating device 402 and target mobile device 406. In such a manner, system 400 serves to effectuate mobile communication utilizing fewer core network (e.g., GSM, TDMA, CDMA, etc.) resources as compared with conventional systems.

Figure 5:
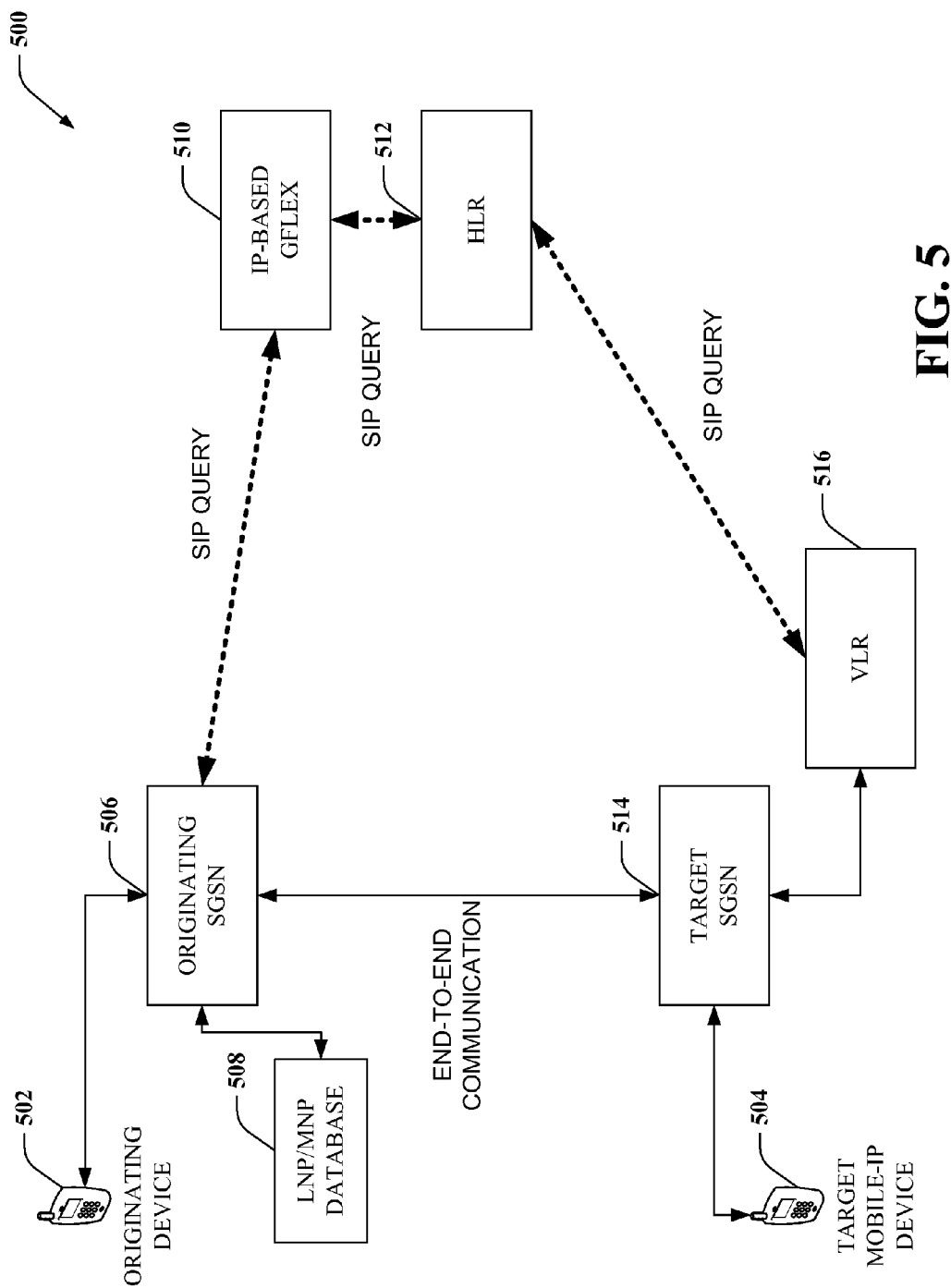
FIG. 5 depicts an exemplary system for preserving network resources for a packet-switched mobile communication in accordance with additional aspects disclosed herein.

FIG. 5 depicts an exemplary system for preserving network resources for a packet-switched mobile communication in accordance with additional aspects disclosed herein. Originating device 502 can be any suitable voice or voice and data communication device that can interface with a packet-switched (PS) mobile network or any suitable network capable of interfacing with a PS network. Originating device 502 can send a request for communication with a target mobile-IP device 504. Such request can either be received at or routed to (e.g., by a GGSN) an originating SGSN 506 associated with a PS network.

Originating SGSN 506 can provide mobility management functions for mobile-IP devices, route communication from a core network component such as a GGSN to an IP communication device and vice versa, manage billing information associated with mobile voice and/or data usage, etc. Specifically, originating SGSN 506 can receive a request from originating device 502 to communicate with target mobile-IP device 504. In a manner similar to that described above for the CS network, originating SGSN 506 can identify a service provider associated with target mobile-IP device 504 (e.g., from LNP/MNP database 508) and request routing information related to such device from an IP-based GFLEX 510. Such request can be via an SIP query or similar IP signaling/setup protocol. IP-based GFLEX 510 can reference an HLR 512 associated with target mobile-IP device 504, which can obtain routing information associated with a target SGSN 514 serving such device. VLR 516 can forward the routing information to HRL 512 by SIP protocol or similar. HLR 512 can provide the routing information to IP-based GFLEX 510, which can then provide originating SGSN 506 with such routing information. Consequently, originating SGSN 506 can establish an end-to-end packet switch communication between originating SGSN 506 and target SGSN 514, effectively forming an end-to-end communication between originating device 502 and target mobile-IP device 504. Thus, system 500 can avoid utilizing finite bandwidth resources associated with PS routers of a PS network (e.g., UMTS, GSM/EDGE, etc.) for signaling and setup procedures, utilizing a signaling network instead.

Figure 6:
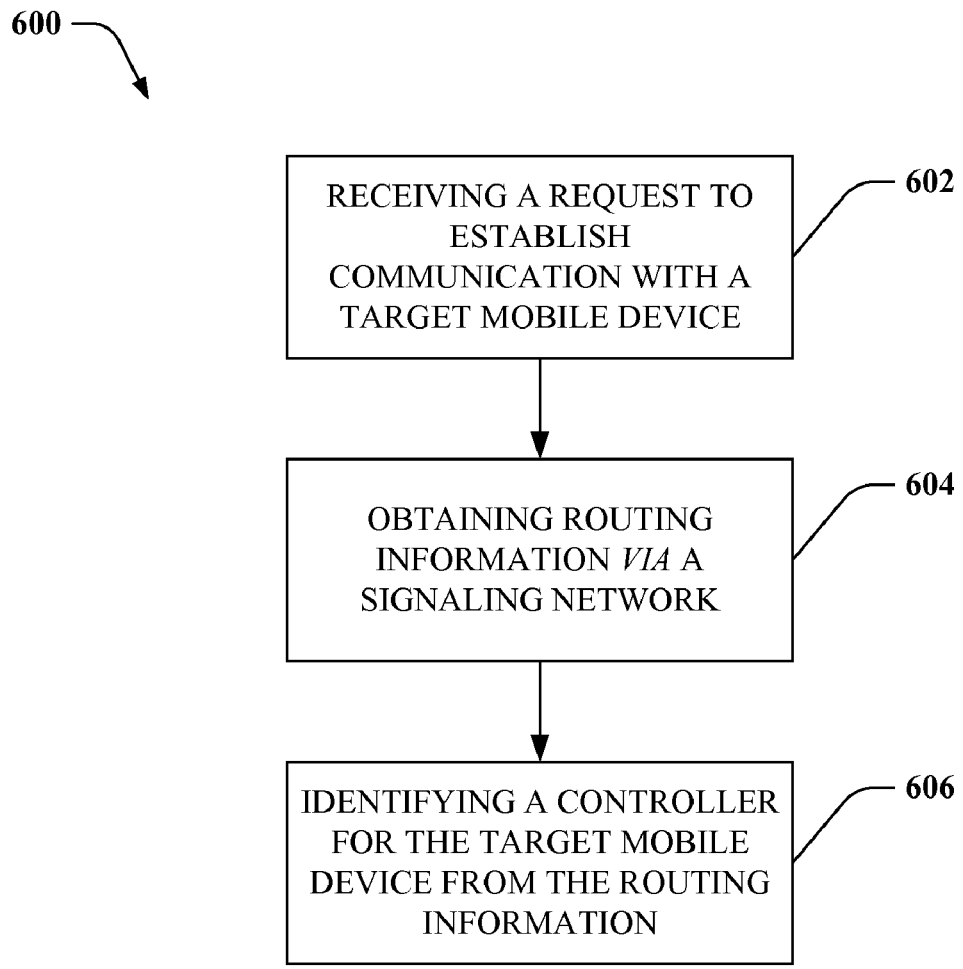
FIG. 6 illustrates an example methodology for facilitating end-to-end communication via signaling resources in accord with aspects of the claimed subject matter.
Figure 7:
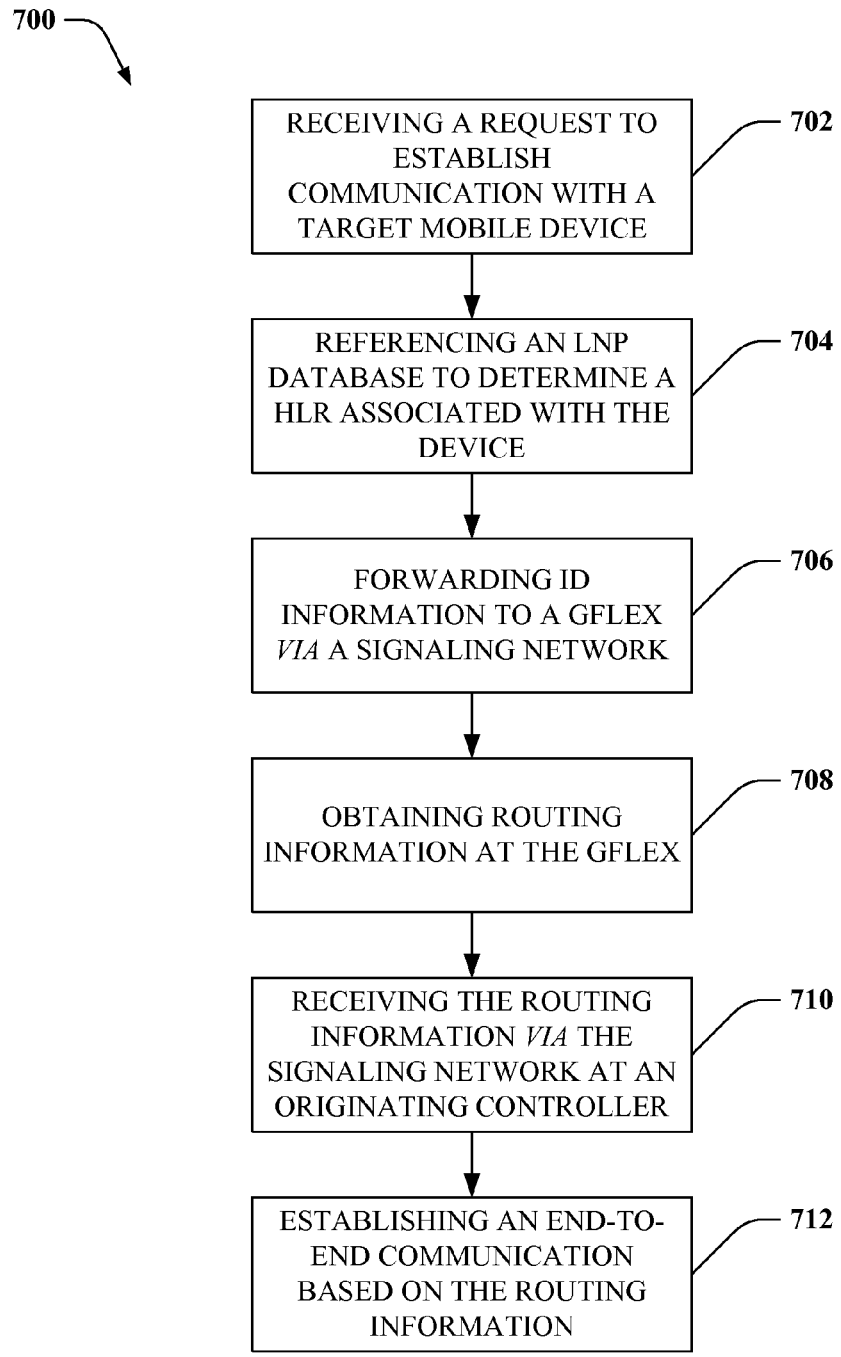
FIG. 7 depicts an exemplary methodology for increasing network capacity and scalability for mobile communication in accordance with aspects disclosed herein.

FIGS. 6 and 7 illustrate exemplary methodologies in accord with aspects of the claimed subject matter. While, for purposes of simplicity of explanation, the methodologies are shown and described as a series of acts, it is to be understood and appreciated that the claimed subject matter is not limited by the order of acts, as some acts can occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers.

FIG. 6 illustrates an example methodology for facilitating end-to-end communication via signaling resources in accord with aspects of the claimed subject matter. At 602, a request is received to establish communication with a target mobile device. The request can be received at a network controlling device responsible for network mobility management (e.g., MSC, SGSN, or like device) and initiation of end-to-end communication procedures between remote network components. The target mobile device can be any suitable CS and/or PS mobile communication device including, e.g., a cellular (GSM, TDMA, CDMA, IS-95, or like network-compatible device) telephone, mobile VoIP phone, or combination cellular/VoIP phone such as a dual-mode or multi-mode cellular/WiFi device. Additionally, the request can contain information to uniquely identify such target mobile device (e.g., mobile phone number) that can be utilized to identify a mobile carrier responsible for providing communication services thereto.

At 604, routing information is obtained via a signaling network. Such signaling network can be an SS7 network utilizing SS7 communication protocols (e.g., ISUP protocols, MAP protocols, and the like utilized in location, signaling, setup, and tear-down functions within a mobile network and between networks of varying architecture), SIP protocols and the like. Specifically, the routing information can be obtained from a GFLEX device associated with a particular mobile provider. The GFLEX device can be responsible for intelligently managing location information across a disperse location registry database. Consequently, the GFLEX can obtain and provide routing information associated with a network access control device currently serving a target mobile device (e.g., a serving MSC, serving SGSN, or the like). For example, the GFLEX can request routing information from an HLR associated with a target mobile device. The HLR typically contains information related to such device, including information identifying a serving MSC and related VLR. The HLR can request routing information pertaining to the serving MSC from the VLR, and forward such routing information to the GFLEX. Other example scenarios for identifying, accessing and relaying routing information associated with a remote MSC serving a roaming device can exist, and are considered part of the subject disclosure in so far as such scenarios are contemplated by one of skill in the art.

At 606, a controller for the target mobile device is identified from the routing information obtained via the signaling network at reference number 604. Identification of a controller for the target mobile device can be sufficient to initiate an end-to-end communication between an originating device and the target mobile device. In accord with example methodology 600, and various aspects thereof, communication with a mobile device can be established in a manner that optimizes use of finite core network resources to increase capacity and scalability associated with such network.

FIG. 7 depicts an exemplary methodology for increasing network capacity and scalability for mobile communication in accordance with aspects disclosed herein. At 702, a request is received to establish communication with a target mobile device. Such device can be any suitable CS and/or PS mobile device, supra. Further, the request can contain a phone number associated with the target mobile device that can be used to identify remote network resources in radio contact with such a device. At 704, an LNP (and/or MNP) database is referenced to determine a carrier and location register base (e.g., HLR, VLR, and the like) associated with the target mobile device. At 706, ID information associated with the target mobile device is forwarded to a GFLEX via a signaling network (e.g., SS7, SIP, or the like). At 708, routing information is obtained at the GFLEX. Such routing information can correspond with a network control device in radio contact with the target mobile device. At 710, the routing information is received via the signaling network at an originating controller. Such originating controller can be, for instance, the controller that received the request to establish communication with the target mobile device at reference number 702. At 712, an end-to-end communication is established based on the routing information received via the signaling network.

As described above, methodology 700 can preserve core network resources by use of a single device bearer channel between an originating controller (e.g., MSC), and a target controller (e.g., MSC) for remote communication with a mobile device. In contrast, conventional methods typically route communication first to a home controller (e.g., MSC) associated with a target device, and then to the target controller, both by finite core network resources (e.g., bearer channels, communication trunks, core network routers, etc.) Consequently, by utilizing signaling network communication for location procedures, methodology 700 can increase capacity and scalability of a core network.

Figure 8:
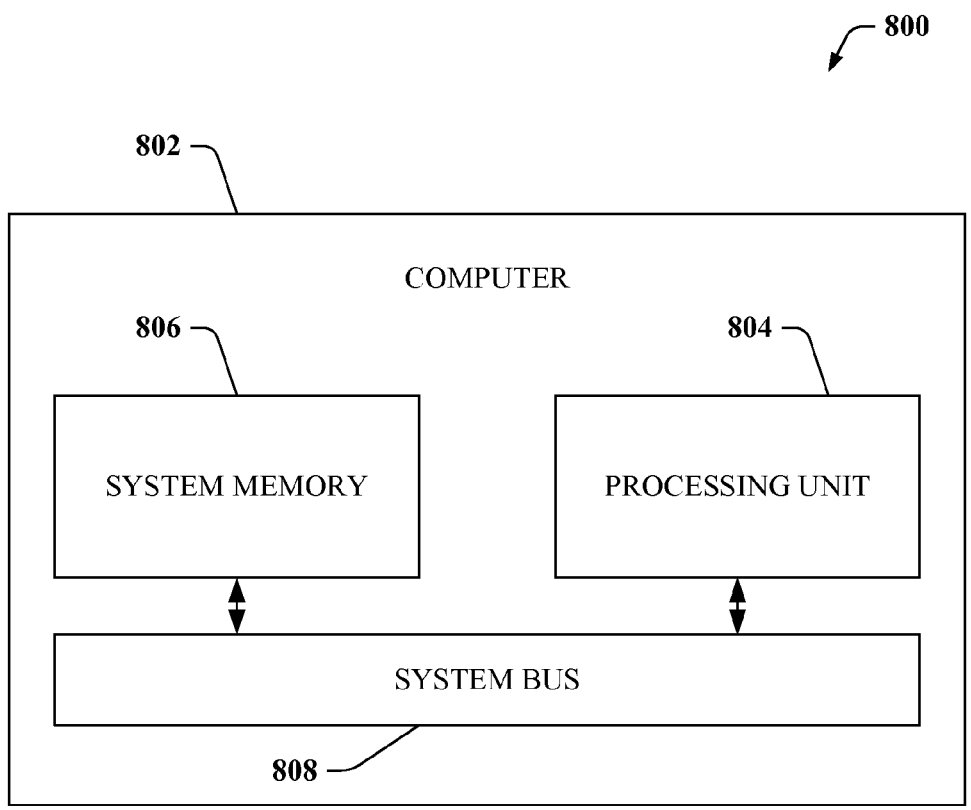
FIG. 8 illustrates a sample computing environment for performing logical functions in accordance with the claimed subject matter.

In order to provide additional context for various aspects of the claimed subject matter, FIG. 8 and the following discussion are intended to provide a brief, general description of a suitable computing environment 800 in which the various aspects described herein can be implemented. While the description above is in the general context of computer-executable instructions that can run on one or more computers, those skilled in the art will recognize that the claimed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of communication media derived from computer-readable media and capable of subsequently propagating through electrically conductive media, (e.g., such as a system bus, microprocessor, data port, and the like) and/or non-electrically conductive media (e.g., in the form of radio frequency, microwave frequency, optical frequency and similar electromagnetic frequency modulated data signals).

With reference again to FIG. 8, the exemplary environment 800 for implementing various aspects includes a computer 802, the computer 802 including a processing unit 804, a system memory 806 and a system bus 808. The system bus 808 couples system components including, but not limited to, the system memory 806 to the processing unit 804. The processing unit 804 can be any of various commercially available processors, such as a single core processor, a multi-core processor, or any other suitable arrangement of processors. The system bus 808 can be any of several types of bus structure that can further interconnect to a memory bus (with or without a memory controller), a peripheral bus, and a local bus using any of a variety of commercially available bus architectures. The system memory 806 can include read-only memory (ROM), random access memory (RAM), high-speed RAM (such as static RAM), EPROM, EEPROM, and/or the like. Additionally or alternatively, the computer 802 can include a hard disk drive, upon which program instructions, data, and the like can be retained. Moreover, removable data storage can be associated with the computer 802. Hard disk drives, removable media, etc. can be communicatively coupled to the processing unit 804 by way of the system bus 808.

The system memory 806 can retain a number of program modules, such as an operating system, one or more application programs, other program modules, and program data. All or portions of an operating system, applications, modules, and/or data can be, for instance, cached in RAM, retained upon a hard disk drive, or any other suitable location. A user can enter commands and information into the computer 802 through one or more wired/wireless input devices, such as a keyboard, pointing and clicking mechanism, pressure sensitive screen, microphone, joystick, stylus pen, etc. A monitor or other type of interface can also be connected to the system bus 808.

The computer 802 can operate in a networked environment using logical connections via wired and/or wireless communications to one or more remote computers, phones, or other computing devices, such as workstations, server computers, routers, personal computers, portable computers, microprocessor-based entertainment appliances, peer devices or other common network nodes, etc. The computer 802 can connect to other devices/networks by way of antenna, port, network interface adaptor, wireless access point, modem, and/or the like.

The computer 802 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least WiFi and Bluetooth™ wireless technologies. Thus, the communication can be a predefined structure as with a conventional network or simply an ad hoc communication between at least two devices.

WiFi, or Wireless Fidelity, allows connection to the Internet from a couch at home, a bed in a hotel room, or a conference room at work, without wires. WiFi is a wireless technology similar to that used in a cell phone that enables such devices, e.g., computers, to send and receive data indoors and out, anywhere within the range of a base station. WiFi networks use radio technologies called IEEE 802.11(a, b, g, etc.) to provide secure, reliable, fast wireless connectivity. A WiFi network can be used to connect computers to each other, to the Internet, and to wired networks (which use IEEE 802.3 or Ethernet). WiFi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 9:
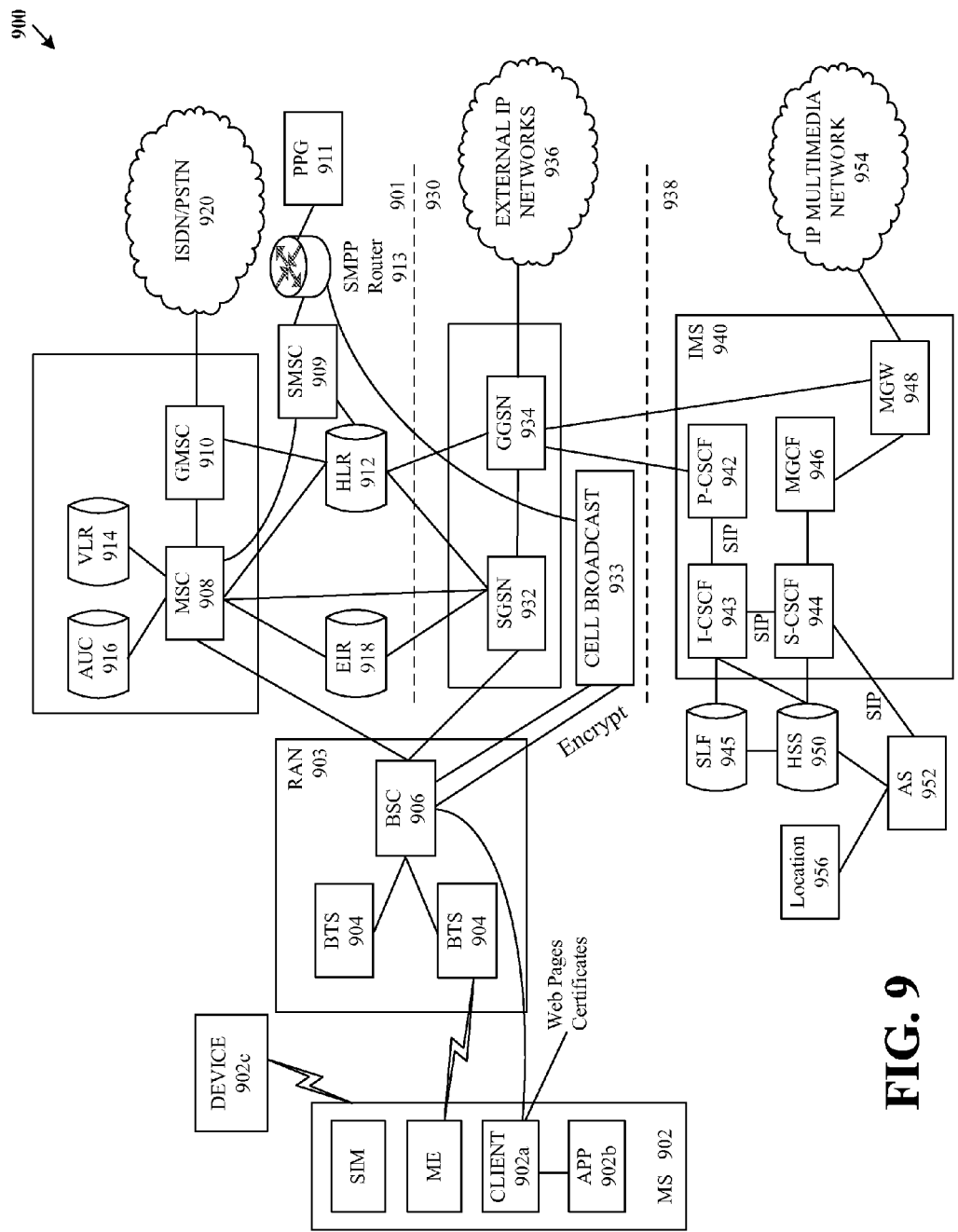
FIG. 9 depicts an example networking environment applicable to aspects of the subject innovation.

Now turning to FIG. 9, such figure depicts a GSM/GPRS/IP multimedia network architecture 900 that includes a GSM core network 901, a GPRS network 930 and an IP multimedia network 938. The GSM core network 901 includes a Mobile Station (MS) 902, at least one Base Transceiver Station (BTS) 904 and a Base Station Controller (BSC) 906. The MS 902 is physical equipment or Mobile Equipment (ME), such as a mobile phone or a laptop computer that is used by mobile subscribers, with a Subscriber identity Module (SIM). The SIM includes an International Mobile Subscriber Identity (IMSI), which is a unique identifier of a subscriber. The MS 902 includes an embedded client 902a that receives and processes messages received by the MS 902. The embedded client 902a can be implemented in JAVA and is discuss more fully below.

The embedded client 902a communicates with an application 902b that provides services and/or information to an end user. One example of the application can be navigation software that provides near real-time traffic information that is received via the embedded client 902a to the end user. The navigation software can provide road conditions, suggest alternate routes, etc. based on the location of the MS 902. Those of ordinary skill in the art understand that there are many different methods and systems of locating an MS 902.

Alternatively, the MS 902 and a device 902c can be enabled to communicate via a short-range wireless communication link, such as BLUETOOTH. For example, a BLUETOOTH SIM Access Profile can be provided in an automobile (e.g., device 902c) that communicates with the SIM in the MS 902 to enable the automobile's communications system to pull information from the MS 902. The BLUETOOTH communication system in the vehicle becomes an "embedded phone" that employs an antenna associated with the automobile. The result is improved reception of calls made in the vehicle. As one of ordinary skill in the art would recognize, an automobile is one example of the device 902c. There can be an endless number of devices 902c that use the SIM within the MS 902 to provide services, information, data, audio, video, etc. to end users.

The BTS 904 is physical equipment, such as a radio tower, that enables a radio interface to communicate with the MS. Each BTS can serve more than one MS. The BSC 906 manages radio resources, including the BTS. The BSC can be connected to several BTSs. The BSC and BTS components, in combination, are generally referred to as a base station (BSS) or radio access network (RAN) 903.

The GSM core network 901 also includes a Mobile Switching Center (MSC) 908, a Gateway Mobile Switching Center (GMSC) 910, a Home Location Register (HLR) 912, Visitor Location Register (VLR) 914, an Authentication Center (AuC) 918, and an Equipment Identity Register (EIR) 916. The MSC 908 performs a switching function for the network. The MSC also performs other functions, such as registration, authentication, location updating, handovers, and call routing. The GMSC 910 provides a gateway between the GSM network and other networks, such as an Integrated Services Digital Network (ISDN) or Public Switched Telephone Networks (PSTNs) 920. In other words, the GMSC 910 provides interworking functionality with external networks.

The HLR 912 is a database or component(s) that comprises administrative information regarding each subscriber registered in a corresponding GSM network. The HLR 912 also includes the current location of each MS. The VLR 914 is a database or component(s) that contains selected administrative information from the HLR 912. The VLR contains information necessary for call control and provision of subscribed services for each MS currently located in a geographical area controlled by the VLR. The HLR 912 and the VLR 914, together with the MSC 908, provide the call routing and roaming capabilities of GSM. The AuC 916 provides the parameters needed for authentication and encryption functions. Such parameters allow verification of a subscriber's identity. The EIR 918 stores security-sensitive information about the mobile equipment.

A Short Message Service Center (SMSC) 909 allows one-to-one Short Message Service (SMS) messages to be sent to/from the MS 902. A Push Proxy Gateway (PPG) 911 is used to "push" (e.g., send without a synchronous request) content to the MS 902. The PPG 911 acts as a proxy between wired and wireless networks to facilitate pushing of data to the MS 902. A Short Message Peer to Peer (SMPP) protocol router 913 is provided to convert SMS-based SMPP messages to cell broadcast messages. SMPP is a protocol for exchanging SMS messages between SMS peer entities such as short message service centers. It is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 902 sends a location update including its current location information to the MSC/VLR, via the BTS 904 and the BSC 906. The location information is then sent to the MS's HLR. The HLR is updated with the location information received from the MSC/VLR. The location update also is performed when the MS moves to a new location area. Typically, the location update is periodically performed to update the database as location-updating events Occur.

The GPRS network 930 is logically implemented on the GSM core network architecture by introducing two packet-switching network nodes, a serving GPRS support node (SGSN) 932, a cell broadcast and a Gateway GPRS support node (GGSN) 934. The SGSN 932 is at the same hierarchical level as the MSC 908 in the GSM network. The SGSN controls the connection between the GPRS network and the MS 902. The SGSN also keeps track of individual MS's locations and security functions and access controls.

A Cell Broadcast Center (CBC) 933 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 934 provides a gateway between the GPRS network and a public packet network (PDN) or other IP networks 936. That is, the GGSN provides interworking functionality with external networks, and sets up a logical link to the MS through the SGSN. When packet-switched data leaves the GPRS network, it is transferred to an external TCP-IP network 936, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time. A class B MS can attach to the network for both GPRS services and GSM services simultaneously. However, a class B MS does not support simultaneous operation of the GPRS services and GSM services. That is, a class B MS can only use one of the two services at a given time. A class C MS can attach for only one of the GPRS services and GSM services at a time. Simultaneous attachment and operation of GPRS services and GSM services is not possible with a class C MS.

A GPRS network 930 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS cannot receive pages from a circuit switched domain when engaged in a data call, since the MS is receiving data and is not listening to a paging channel. In a NOM3 network, a MS can monitor pages for a circuit switched network while received data and vise versa.

The IP multimedia network 938 was introduced with 3GPP Release 5, and includes an IP multimedia subsystem (IMS) 940 to provide rich multimedia services to end users. A representative set of the network entities within the IMS 940 are a call/session control function (CSCF), a media gateway control function (MGCF) 946, a media gateway (MGW) 948, and a master subscriber database, called a home subscriber server (HSS) 950. The HSS 950 can be common to the GSM network 901, the GPRS network 930 as well as the IP multimedia network 938.

The IP multimedia system 940 is built around the call/session control function, of which there are three types: an interrogating CSCF (I-CSCF) 943, a proxy CSCF (P-CSCF) 942, and a serving CSCF (S-CSCF) 944. The P-CSCF 942 is the MS's first point of contact with the IMS 940. The P-CSCF 942 forwards session initiation protocol (SIP) messages received from the MS to an SIP server in a home network (and vice versa) of the MS. The P-CSCF 942 can also modify an outgoing request according to a set of rules defined by the network operator (for example, address analysis and potential modification).

The I-CSCF 943 forms an entrance to a home network and hides the inner topology of the home network from other networks and provides flexibility for selecting an S-CSCF. The I-CSCF 943 can contact a subscriber location function (SLF) 945 to determine which HSS 950 to use for the particular subscriber, if multiple HSS's 950 are present. The S-CSCF 944 performs the session control services for the MS 902. This includes routing originating sessions to external networks and routing terminating sessions to visited networks. The S-CSCF 944 also decides whether an application server (AS) 952 is required to receive information on an incoming SIP session request to ensure appropriate service handling. This decision is based on information received from the HSS 950 (or other sources, such as an application server 952). The AS 952 also communicates to a location server 956 (e.g., a Gateway Mobile Location Center (GMLC)) that provides a position (e.g., latitude/longitude coordinates) of the MS 902.

The HSS 950 contains a subscriber profile and keeps track of which core network node is currently handling the subscriber. It also supports subscriber authentication and authorization functions (AAA). In networks with more than one HSS 950, a subscriber location function provides information on the HSS 950 that contains the profile of a given subscriber.

The MGCF 946 provides interworking functionality between SIP session control signaling from the IMS 940 and ISUP/BICC call control signaling from the external GSTN networks (not shown). It also controls the media gateway (MGW) 948 that provides user-plane interworking functionality (e.g., converting between AMR- and PCM-coded voice). The MGW 948 also communicates with other IP multimedia networks 954.

What has been described above includes examples of the claimed subject matter. It is, of course, not possible to describe every conceivable combination of components or methodologies for purposes of describing the claimed subject matter, but one of ordinary skill in the art can recognize that many further combinations and permutations of such matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system comprising:
   at least one processor;
   at least one memory, communicatively coupled to the at least one processor, and containing instructions for execution of computer-executable components, including:
   a data store configured to store information representative of mobile network carriers being associated with respective phone numbers; and
   an access control component communicatively coupled, using an out-of-band signaling network, to a lookup component of a wireless network communicatively coupled to a target mobile device via a mobile network carrier of the mobile network carriers configured to:
   receive, from a communication device, a request to communicate with the target mobile device;
   derive, based on the request, a phone number of the respective phone numbers that is associated with the target mobile device;
   identify the mobile network carrier based on the information and the phone number;
   direct a query, based on a signaling protocol of the out-of-band signaling network, to the lookup component, the query including information identifying the mobile network carrier;
   receive a reply, based on the signaling protocol of the out-of-band signaling network, including routing information that identifies a visiting location component of the wireless network from the lookup component of the wireless network; and
   establish, via the visiting location component of the wireless network, a call between the communication device and the target mobile device based on the routing information.

2. A method comprising:
executing, using at least one processor, computer-readable instructions for performing operations, comprising:
   receiving, by an originating control component communicatively coupled to a location management component of a wireless network utilizing an out-of-band signaling network, a request from a communication device to establish a communication between the communication device and a mobile device communicatively coupled to a terminating control component;
   extracting a phone number of the mobile device from the request;
   identifying the carrier based on the phone number;
   forwarding, by the originating control component, a first communication being directed to the location management component using a signaling protocol of the out-of-band signaling network and including information associated with the carrier;
   receiving, by the originating control component, a second communication from the location management component using the signaling protocol of the out-of band signaling network and including routing information that is associated with the terminating control component; and
   initiating, based on the routing information, the communication via a communication link between the originating control component and the terminating control component.

3. The method of claim 2, wherein the initiating the communication further comprises establishing communications between an originating mobile switching center and a target mobile switching center based on the routing information.

4. The method of claim 2, wherein the initiating the communication via the communication link further comprises:
    identifying, based on the phone number, a switching center having a radio link with the target mobile device; and
    initiating the communication via the switching center.

5. A non-transitory computer readable storage medium comprising computer executable instructions that, in response to execution, cause a computing system to perform operations, comprising:
    receiving, at a first control component communicatively coupled to a location management component utilizing a non-bearer signaling network, a request to establish a communication between a communication device communicatively coupled to the first control component and a target mobile device communicatively coupled to a second control component;
    forwarding, by the first control component, a query directed to the location management component using a signaling protocol of the non-bearer signaling network and including information identifying a carrier;
    receiving, by the first control component, a response from the location management component using the signaling protocol of the non-bearer signaling network and including routing information that is associated with the second control component; and
    initiating, via the first control component and the second control component, end-to-end communication between the communication device and the target mobile device based on the routing information.

6. The non-transitory computer readable storage medium of claim 5, further comprising recording the routing information in response to the target mobile device registering onto a communication network.

7. The system of claim 1, wherein the access control component comprises a serving mobile switching center coupled to the originating communication device.

8. The system of claim 1, wherein the out-of-band signaling network is based on a session initial protocol.

9. The method of claim 2, further comprising:
    referencing a mobile number portability data store based on the phone number.

10. The non-transitory computer readable storage medium of claim 5, wherein the identification information includes a phone number of the target mobile device.

11. The non-transitory computer readable storage medium of claim 5, wherein the non-bearer signaling network is based on a session initial protocol.

12. The system of claim 1, wherein the communication device is coupled to an originating serving general packet radio service support node and the target mobile device is coupled to a target serving general packet radio service support node.

13. The method of claim 2, wherein the forwarding further comprises:
    forwarding the phone number to the location management component via a session initial protocol.

14. The system of claim 1, wherein the access control component is further configured to identify the mobile network carrier, based on the telephone number, utilizing a mobile number portability data store including a list that includes a mobile number and a carrier associated with the mobile number.

15. The system of claim 10, further comprising identifying carrier information based on the telephone number.

16. The method of claim 2, wherein the identifying the mobile network carrier further comprises referencing a mobile number portability data store utilizing the phone number.

17. The method of claim 2, wherein the initiating the communication further includes initiating the communication between an originating serving general packet radio service support node and a target general packet radio service support node.

18. The method of claim 2, wherein the initiating the communication further comprises establishing the communication link between an originating mobile switching center and a target mobile switching center.

19. The system of claim 1, wherein the out-of-band signaling network is based on a mobile application part protocol.

20. The method of claim 2, further comprising:
    referencing a local number portability data store based on the phone number.

* * * * *